United States Patent
Glickman

(10) Patent No.: US 7,111,420 B2
(45) Date of Patent: Sep. 26, 2006

(54) SNAP-IN LICENSE PLATE BRACKET FOR AUTOMOTIVE VEHICLE

(75) Inventor: David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 10/604,489

(22) Filed: Jul. 25, 2003

(65) Prior Publication Data

US 2005/0017141 A1  Jan. 27, 2005

(51) Int. Cl.
*G09F 7/00* (2006.01)

(52) U.S. Cl. .............. 40/209; 40/200; 248/222.11; D12/193; 293/115

(58) Field of Classification Search .......... 248/220.41, 248/488; 40/200, 209; D12/193; 293/115
See application file for complete search history.

(56) References Cited

U.S. PATENT DOCUMENTS

| | | | | |
|---|---|---|---|---|
| 2,178,727 A | * | 11/1939 | Owens | ........................ 411/143 |
| 3,089,269 A | | 5/1963 | McKiernan | |
| 3,379,402 A | * | 4/1968 | Trammell, Jr. | ............... 248/488 |
| 3,430,376 A | * | 3/1969 | Fritz et al. | ..................... 40/209 |
| 3,683,529 A | * | 8/1972 | Reed | ............................. 40/209 |
| 4,302,896 A | * | 12/1981 | Bott | ............................ 40/209 |
| 4,537,821 A | | 8/1985 | Fast | |
| 4,539,766 A | | 9/1985 | Fast | |
| 4,736,539 A | | 4/1988 | Dickinson | |
| 5,450,058 A | | 9/1995 | Collier | |
| 5,813,640 A | | 9/1998 | Koch et al. | |
| 5,870,841 A | * | 2/1999 | Brody et al. | ................... 40/200 |
| 6,167,645 B1 | | 1/2001 | Gasko et al. | |
| 6,581,252 B1 | * | 6/2003 | Sedlock et al. | ............... 24/297 |
| 6,681,507 B1 | * | 1/2004 | Lieziert | ........................ 40/209 |
| 6,729,053 B1 | * | 5/2004 | Castro | ........................ 40/209 |

FOREIGN PATENT DOCUMENTS

JP  356039938 A  *  4/1981

\* cited by examiner

*Primary Examiner*—Anita M. King
(74) *Attorney, Agent, or Firm*—Gigette M. Bejin; Artz & Artz

(57) ABSTRACT

A license plate bracket for an automotive vehicle includes a generally planar body having self-locking axially engageable retention structures extending from a rear side of the generally planar body. The retention structures allow the license plate bracket to be pushed into locking engagement with a front or rear module of a vehicle without the need for tools, while allowing the bracket to be removed subsequently without leaving any unsightly holes in the bodywork of the vehicle.

6 Claims, 3 Drawing Sheets

SNAP-IN LICENSE PLATE BRACKET FOR AUTOMOTIVE VEHICLE

BACKGROUND OF INVENTION

1. Field of the Invention

The present invention relates to a mounting arrangement for placing a license plate bracket on an automotive vehicle.

2. Disclosure Information

The task of providing mountings for the license plate frames of automotive vehicles presents an unusual challenge to automotive designers and engineers by virtue of the fact that there are many jurisdictions which do not require the use of front license plates, whereas other jurisdictions do. Accordingly, although all vehicles must naturally have the capability for mounting a front number plate, it is highly desirable to not have such license plate brackets mounted on all vehicles, for appearance reasons alone. Moreover, it is highly desirable to not cut holes through front end fascia and bumpers and other end structures of vehicles for the purpose of mounting license plate brackets.

The reasons for avoiding the drilling of holes in a vehicle structure for the purpose of mounting a license plate bracket are manifold. First, the precision with which holes must be drilled so as to avoid out of place brackets requires that a fair amount of time be spent, usually at a high hourly cost, whether the drilling is done at an assembly plant or in the field. Moreover, if a vehicle changes hands and the new owner either does not want a number plate on the front or is not required by law to maintain such a number plate, the owner may wish to remove the license plate frame or bracket and will be understandably upset if unsightly holes are left in the front end structure of the vehicle. Accordingly, it is desirable to provide a license plate bracket that may be installed without the necessity of drilling any holes, so as to save time, money and ultimately the appearance of the vehicle itself, in the aftermath of the removal of a license plate bracket. U.S. Pat. No. 6,167,645 discloses a license plate bracket which has two clips at an upper portion thereof, but which must be fastened with screws, thereby necessitating undesirable drilling and also risking damage to the grille of the vehicle to which the bracket of the '645 patent is attached or installed.

A license plate bracket according to the present invention solves the problems inherent with prior art brackets by allowing a bracket to be installed without the need for tools, without the need for drilling and with the capability for removing the bracket entirely, without causing any damage or degradation in the appearance of the vehicle following the removal of the bracket.

SUMMARY OF INVENTION

A license plate bracket for an automotive vehicle includes a generally planar body having a front side adapted to receive a license plate, and a rear side. A plurality of self-locking, axially engageable retention structures extends from the rear side of the generally planar body, with the retention structures comprising at least one primary retention structure adapted to axially engage a vehicular surface to which the bracket is being mounted, so as to establish an axis of limited rotation of the bracket, with the axis of rotation being parallel to a major axis of the generally planar body. The plurality of retention structures extending from the rear side of the generally planar body further includes at least one secondary retention structure which is adapted to axially engage and lock itself with the vehicular surface to which the license plate bracket is being applied at such time as the generally planar body is rotated into contact with the vehicular surface. A license plate bracket according to the present invention preferably includes a primary retention structure having a planar hook with a major axis which is parallel to the major axis of the generally planar body.

According to another aspect of the present invention, a secondary retention structure for a vehicular license plate bracket may comprise either a spring loaded toggle having a sprag extending from a flat strap, or alternatively could comprise a resiliently ribbed stud.

In a preferred embodiment, a license plate bracket according to the present invention has a plurality of primary retention structures and a plurality of secondary retention structures.

According to another aspect of the present invention, an end module for an automotive vehicle, which may comprise, for example, a front end module, includes a first exterior body panel, and a second exterior body panel abuttingly engaged with the first exterior body panel. A license plate bracket is mounted to the end module, with the bracket comprising a generally planar body having a front side adapted to receive a license plate and a rear side, and a plurality of self-locking retention structures extending from the rear side of the generally planar body, with the retention structures comprising at least a primary retention structure adapted to pass through a passage, such as an air passage, formed in the first exterior body panel, with the primary retention structure locking itself upon a wall of the passage, and with the self-locking retention structures further including at least one secondary retention structure adapted to extend through a port defined by the abutment of the first exterior body panel and the second exterior body panel. The secondary retention structure locks itself upon at least one of the first and second exterior body panels.

According to another aspect of the present invention, a method of manually attaching a license plate frame to an automotive vehicle without the use of tools includes the steps of inserting a primary retention structure into a passage, such as an air passage, formed in an end module, and thereby locking the primary retention structure to a wall of the passage, and inserting a plurality of secondary retention structures in passages formed at the intersection of adjacent panels comprising an end module, thereby locking the secondary retention structures and the license plate frame to at least one of the adjacent panels.

It is an advantage of a system according to the present invention that a license plate bracket may be both applied to a vehicle and subsequently removed from the vehicle without the use of any tools such as those required for drilling or applying threaded or unthreaded fasteners.

It is a further advantage of the present invention that the present license plate bracket may be applied to a vehicle with greatly reduced labor cost because of the absence of any need to drill holes or locate holes in a vehicle structure.

It is a further advantage of the license plate bracket and mounting method according to the present that vehicles need not be produced with pilot holes or other holes in their fascia so as to allow the mounting of a license plate bracket.

Other advantages, as well as objects and features of the present invention, will become apparent to the reader of this specification.

DETAILED DESCRIPTION

Figure 1:
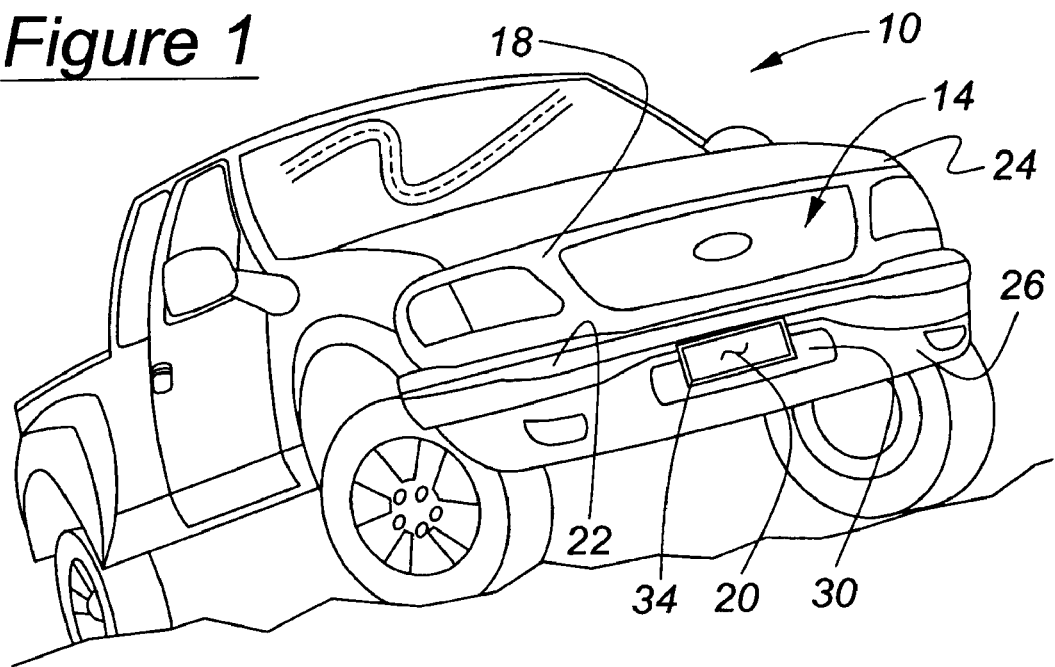
FIG. 1 is a perspective view of a pickup truck having a license plate bracket mounted according to the present invention.
Figure 2:
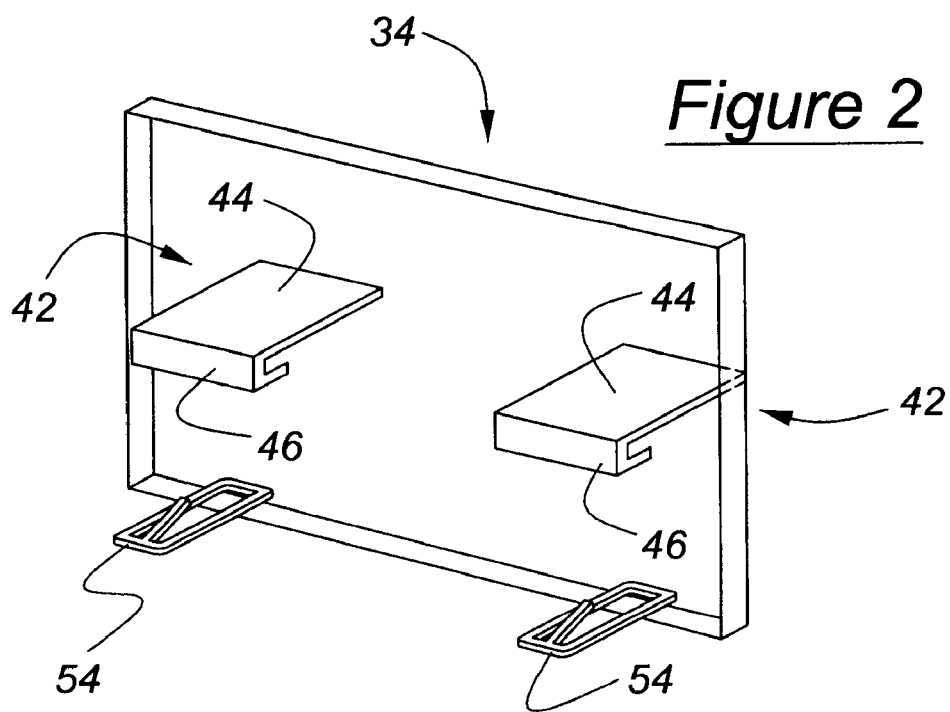
FIG. 2 is a perspective view of a first embodiment of a license plate bracket according to the present invention.

As shown in FIG. 1, vehicle 10 has a front end module 14 with a grille opening panel 18, bumper 22, and valance panel 26 which abuts bumper 22 and extends under bumper 22 from left to right across vehicle 10. License plate 20 is mounted upon a license plate bracket 34, which is mounted according to the present invention. FIG. 2 shows a first embodiment of a license plate bracket according to the present invention. Generally planar body 38, which has a front side adapted to receive a license plate, has a plurality of self-locking axially engageable retention structures extending from the rear side of generally planar body 38. Two primary retention structures 42 are shown in FIG. 2. Each primary retention structure 42 has a flat strap 44 extending from generally planar body 38 and a hook end 46 which extends from flat strap 44. Notice in the embodiment of FIG. 4 that as an alternative, primary retention structure 42 may comprise a single planar hook with a wide flat strap 44 mounted at a midpoint of the rear side of generally planar body 38 and having a hook 46 attached thereto. When hooked upon a vehicle structure, primary retention structure 42 allows limited rotation of bracket 34 sufficient to permit the bracket to be snapped or locked home in the structure to which it is being mounted.

Figure 3:
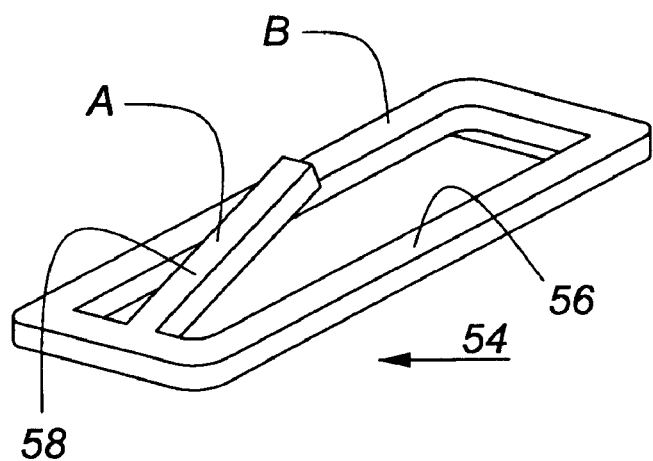
FIG. 3 illustrates one type of secondary retention structure which may be employed with a license plate bracket according to the present invention.

In a first embodiment, a license plate bracket according to the present invention further includes two secondary retention structures 54 which are spring loaded toggles. These devices are shown with particularity in FIG. 3. Each spring loaded toggle 54 includes a flat strap 56 having a integral sprag 58 formed therewith. The primary and secondary retention structures, as well as the balance of license plate bracket 34 according to the present invention may be formed of plastic material such as molded nylon or other resins, or from other metallic or non-metallic materials known to those skilled in the art and suggested by this disclosure.

Figure 4:
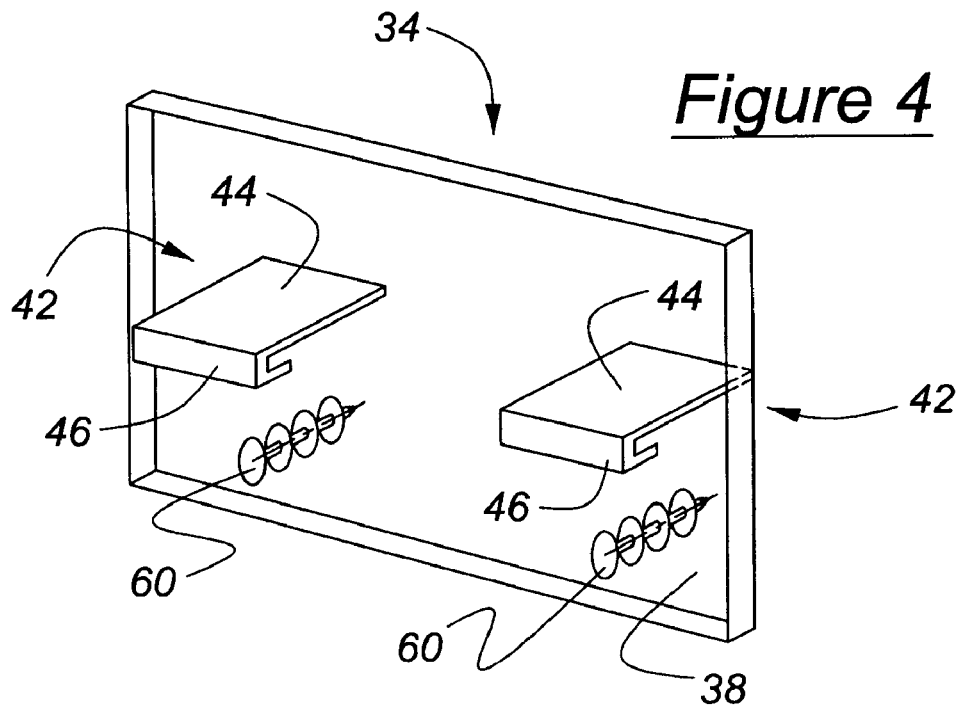
FIG. 4 illustrates a second embodiment of a license plate bracket according to the present invention.

The embodiment of FIG. 4 further illustrates the use of ribbed studs 60 as a second type of secondary retention structure. Studs 60 may be pushed through circular holes formed in the structure to which license plate bracket 34 is being applied. Alternatively, ribbed stud 60 may simply rest against a surface to which license plate bracket 34 is being applied, with stud 60 being loaded in compression.

Figure 5:
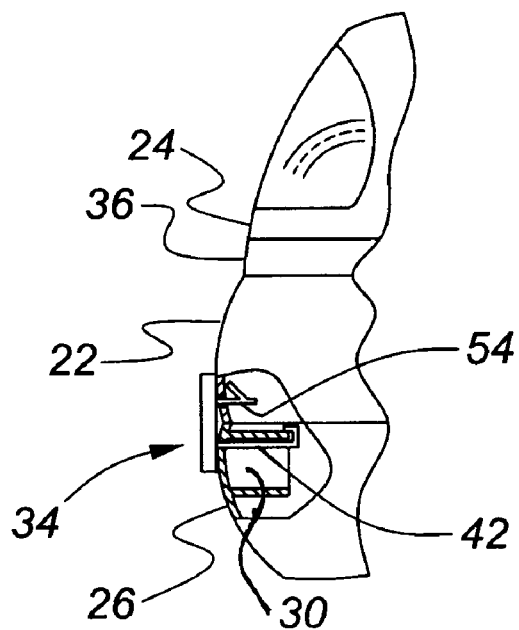
FIG. 5 illustrates a license plate bracket according to the present invention applied to a vehicle as shown in FIG. 1.
Figure 6:
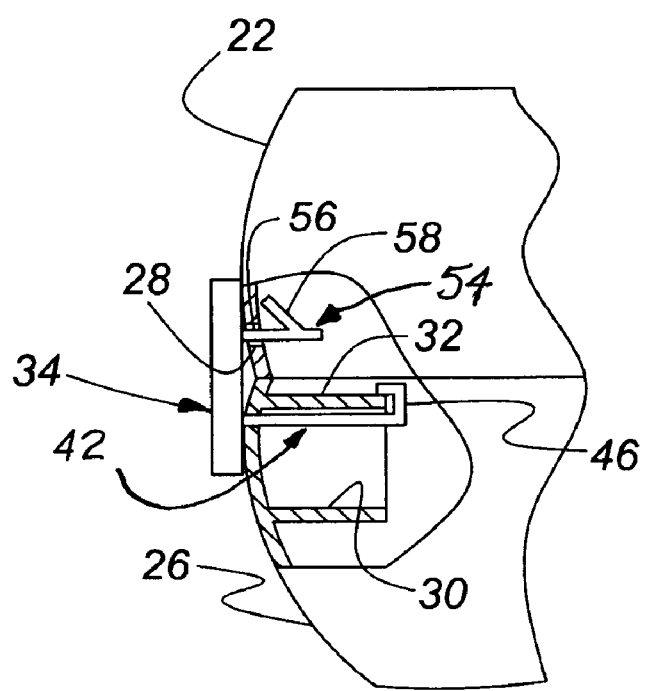
FIG. 6 is an enlarged view of a portion of FIG. 5 showing with detail the fitment of a license plate bracket according to the present invention to a vehicle having abutting end module structures.

FIG. 5 illustrates usage of the present license plate bracket. Thus, a vehicle having a fender 24, filler panel 36, bumper 22, and valance panel 26, has license plate bracket 34 mounted with spring toggles 54, which as noted above, comprise secondary retention structures. Bracket 34 also has two primary retention structures 42. Although FIGS. 5 and 6 show bracket 34 as being installed with primary retention structures 42 below secondary retention structures 54, bracket 34 may be installed in the orientation shown in FIGS. 2 and 4. The precise orientation of bracket 34 will normally be dictated by the details of the structure to which bracket 34 is being applied.

As shown with more particularity in FIG. 6, flat strap portion 56 of spring loaded toggle 54 extends through port, aperture, or slot, 28 formed at the intersection between bumper 22 and valance panel 26. This slot is not normally visible to the casual observer, because one's eye will not be drawn to port 28 in the event that a license plate bracket 34 is not installed on vehicle 10. Once license plate bracket 34 is installed, sprag 58 pops up as shown and locks the upper portion of license plate bracket 34 to the vehicle by bearing against an inboard portion of bumper 22. Similarly, primary retention structure 42 passes through passage 30, which may comprise an air passage, and locks upon upper wall 32 of passage 30 with its hook end 46. In this manner, license plate bracket 34 is retained securely upon bumper 22 and valance panel 26, without the need for the drilling of extra holes, while permitting the installation of license plate bracket 34 without the use of tools because bracket 34 need only be first hooked with hook end 46 upon upper wall 32 at the inboard end of passage 30, and then rotated upwards so that sprags 58 bear upon a back or inboard portion of bumper 22 or valance panel 26. Moreover, license plate bracket 34 may be removed by compressing sprags 58 and extracting toggles 54, thereby leaving no evidence that license plate bracket 34 ever was installed upon vehicle 10.

Those skilled in the art will appreciate in view of this disclosure that the present system and method could be employed with vehicular end modules comprising either front end modules or rear modules. Moreover, the adjacent panels useful for practicing this invention could comprise a bumper and a valance panel, or other types of panels having an abutting engagement producing an intersection with a slot-like aperture or port existing between the abutting panels. The abutting panels, by defining a port or slot, allow the secondary retention structures, as noted above, terminated with spragform integral retention toggles, to pass through a very narrow slots and into secure engagement with a panel behind the position at which license plate bracket 34 is mounted. Alternatively, dedicated slots could be formed in a panel to allow the passage of the various axially engageable retention structures employed as part of the present license invention.

Although the present invention has been described in connection with particular embodiments thereof, it is to be understood that various modifications, alterations, and adaptations may be made by those skilled in the art without departing from the spirit and scope of the invention set forth in the following claims.

The invention claimed is:

1. An end module for an automotive vehicle, comprising:
   a first exterior body panel;
   a second exterior body panel abuttingly engaged with said first exterior body panel; and
   a license plate bracket mounted to said end module, with said bracket comprising:
   a generally planar body having a front side adapted to receive a license plate, and a rear side; and
   a plurality of self-locking retention structures extending from the rear side of said generally planar body, with said retention structures comprising at least a primary retention structure adapted to extend through a passage formed in said first exterior body panel, with said primary retention structure locking itself upon a wall of said passage, and with said self-looking retention structures further comprising a secondary retention structure adapted to extend through a port defined by the abutment of said first exterior body panel and said second exterior body panel, with said secondary retention structure locking itself upon at least one of said first and second exterior body panels.

2. An end module for an automotive vehicle according to claim 1, wherein said first exterior body panel comprises a valance panel, and said second exterior body panel comprises a bumper.

3. An end module according to claim 1, wherein said license plate bracket has a single primary retention structure and a plurality of secondary retention structures, with each of said secondary retention structures comprising a generally flat strap extending through a generally flat port defined between said first and second exterior body panels, and with said secondary retention structures each terminating with an integral retainer toggle.

4. An end module according to claim 3, wherein each of said retainer toggles comprises a sprag formed integrally with a generally flat strap.

5. An end module according to claim 1, wherein said license plate bracket has a plurality of primary retention structures and a plurality of secondary retention structures, with each of said primary retention structures comprising a generally flat strap having a hook end for engaging one of said exterior body panels, and with each of said secondary retention structures comprising a generally flat strap extending through a generally flat port defined between said exterior body panels, and with said secondary retention structures each terminating with an integral retainer toggle.

6. An end module according to claim 1, wherein said passage comprises an air passage.

* * * * *